US006097105A

United States Patent [19]

Oikawa

[11] Patent Number: 6,097,105

[45] Date of Patent: Aug. 1, 2000

[54] MOTOR CONTROLLING EQUIPMENT FOR POWER WINDOW

[75] Inventor: Hiroshi Oikawa, Saitama, Japan

[73] Assignee: Toyodenso Kabushiki Kaisha, Tokyo, Japan

[21] Appl. No.: 09/144,976

[22] Filed: Sep. 1, 1998

[30] Foreign Application Priority Data

Sep. 2, 1997 [JP] Japan ................................ H9-237166

[51] Int. Cl.[7] .............................. B60L 1/00; H01H 15/00

[52] U.S. Cl. ........................................... 307/10.1; 200/5 R

[58] Field of Search .......................... 307/10.1; 200/1 B, 200/5 R, 307; 361/784, 792, 803

[56] References Cited

U.S. PATENT DOCUMENTS 4,816,961 3/1989 Saulgeot et al. ....................... 361/142

5,821,483 10/1998 Yamaguchi et al. .................... 200/5 R

*Primary Examiner*—Fritz Fleming

*Assistant Examiner*—R. Rios Cuevas

*Attorney, Agent, or Firm*—Birch, Stewart, Kolasch & Birch, LLP

[57] ABSTRACT

A driver switch 1 moves a slider 9 supported in a recess 12 provided on a control equipment main body 4 through an arm 8 integrated with a knob 7. On the slider 9, a movable contact 10 is provided, which contacts with stationary contacts formed on an auto circuit board 11 piled on a rear face of the control equipment main body 4 and can switch a manual operation and an auto operation. This output of the driver switch 1, in either case of the manual operation and the auto operation, controls a motor of the driver side window through the relay 18. An assistant side switch is a manual switch and controls directly the motor of an assistant side window through operating a manual circuit integrated with the control equipment main body 4 by the switch formed thereon.

7 Claims, 6 Drawing Sheets

MOTOR CONTROLLING EQUIPMENT FOR POWER WINDOW

BACKGROUND OF THE INVENTION

1. Field of the invention

The present invention relates to a motor controlling equipment for a power window provided together with an auto switch and a manual switch such as master switch.

2. Description of the Prior Art

Various kinds of the motor controlling equipment for the power window are well known, for example such as laid open utility model Hei2-1819, laid open utility model Hei2-98418 and utility model Hei6-41298.

In the laid open utility model Hei2-1819, the motor controlling equipment for the power window comprising a plurality of knobs to switch on and off in a manual type corresponding to each windows, a switch board provided with a plurality of inner switches switching on and off corresponding to these knob and a relay board equipped with relays driven by an output of the switch board, and the switch board and the relay board are superposed in an up and down direction.

In utility model Hei6-41298, a master switch comprising a manual switch and an auto switch is shown. Hereupon, the manual switch is composed to rise and fall a window making a motor to rotate in an forward and reverse direction by turning over a V shaped swinging contact to an operational direction of a knob and the auto switch is provided with a mechanical type contact holding means using a solenoid.

Now, in a case of controlling a motor by a relay as set forth in laid open utility model Hei2-1819, it can be done to miniaturize whole body by superposing a relay board with a switch board. However, because it is required to provide inner switches corresponding to all the operating knobs and switch circuits therefor, there is a limit to miniaturize the switch board and this resulted in that a whole size is limited from a size of the switch board.

On the other hand, when the switch is composed as utility model Hei6-41298, it can be made at a low cost, but the size of the entire equipment is made to be all the larger because it requires comparatively complex mechanical construction. Therefore, an object of the present application is to simplify the whole construction through composing an auto switch using a relay and to make the whole body to be compact by forming a manual circuit as small as possible.

SUMMARY OF THE INVENTION

Motor controlling equipment for a power window is provided that includes a controlling equipment main body and an automatic switch operatively connected to a motor for selectively activating a first door window by either a manual operation or an automatic operation. A manual switch is operatively connected to a motor for selectively activating one or more additional door windows by a manual operation The manual switch directly controls the motor by a switching operation of a manual circuit formed in said controlling equipment main body The automatic switch is mounted relative to an automatic circuit board formed distinct from said controlling equipment main body, said automatic circuit boardincluding switch contacts and relays for the manual operation and the automatic operation, said automatic circuit board being mounted in an overlapping arrangement relative to said controlling equipment main body for controlling the motor through the relays.

The present invention is also directed to motor controlling equipment for the power window, wherein the auto switch is adapted to be controlled by a knob in an opposite side of the auto circuit board across the controlling equipment main body through a through hole formed in the main body of the controlling equipment.

According to the present invention, since a contact portion of the auto switch and the relay are composed on the auto circuit board and the motor is adapted to control through the relay, the auto switch can be simply constructed and the manual circuit in the auto switch can be integrally constructed with the auto circuit board.

On the other hand, because in the manual switch side, only the manual circuit portion is simply provided on the control equipment main body and it is not required to provide the manual circuit of the auto switch, it becomes more compact.

Hence, because the auto circuit board is mounted overlapping on the control equipment main body and the size of the auto circuit board and that of the manual circuit portion of the control equipment main body can be made to be nearly the same degree, so that the whole motor control equipment for the power window can be manufactured to be very compact.

According to the present invention, because the auto switch is adapted to be operated through a through hole made on the control equipment main body, the auto circuit board can be arranged to overlap with the manual circuit formed on the control equipment main body, so that the whole equipment can be made to be more compact as well.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
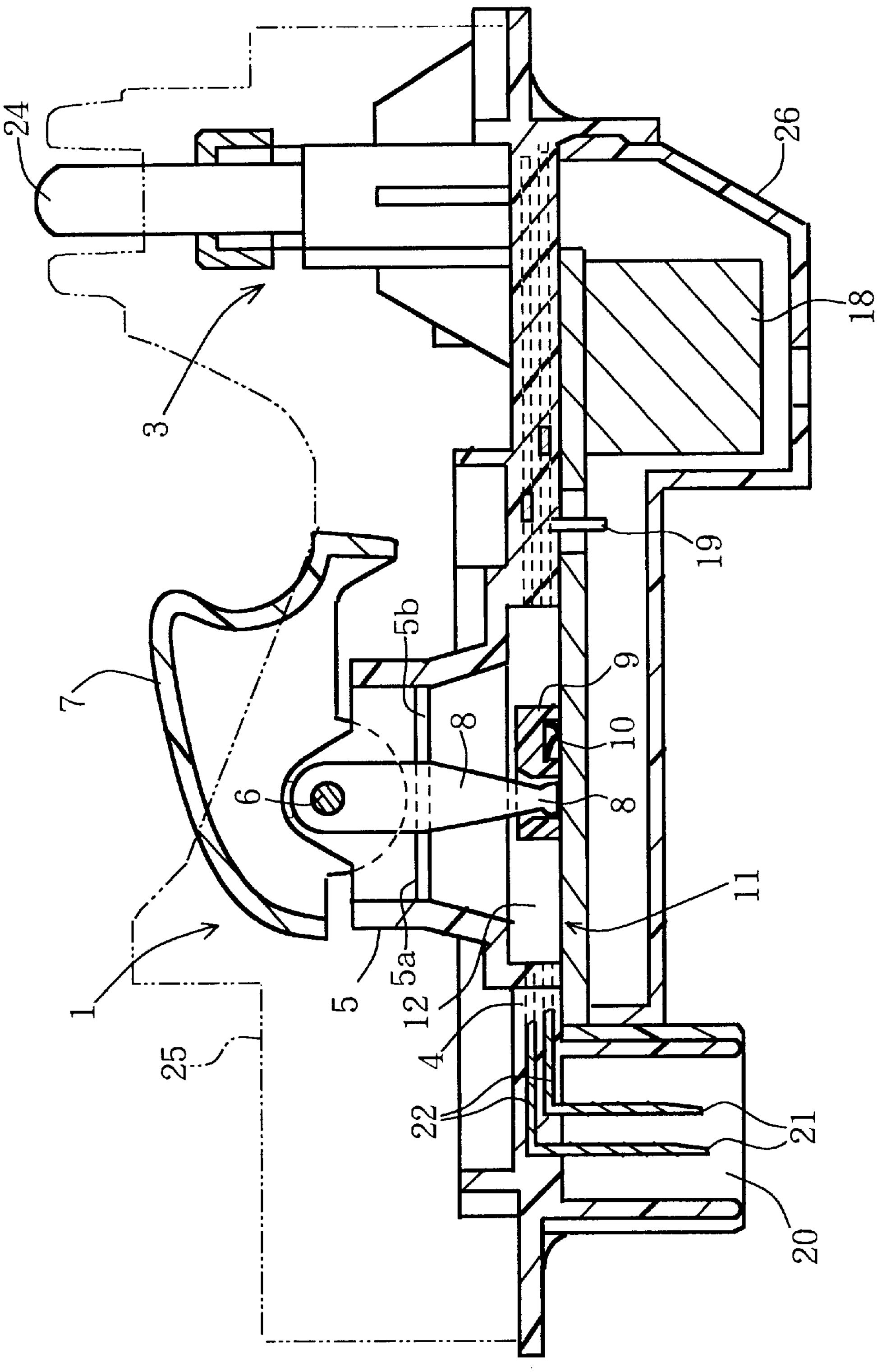
FIG. 1 is a sectional view of a driver switch portion according to the first embodiment.
Figure 2:
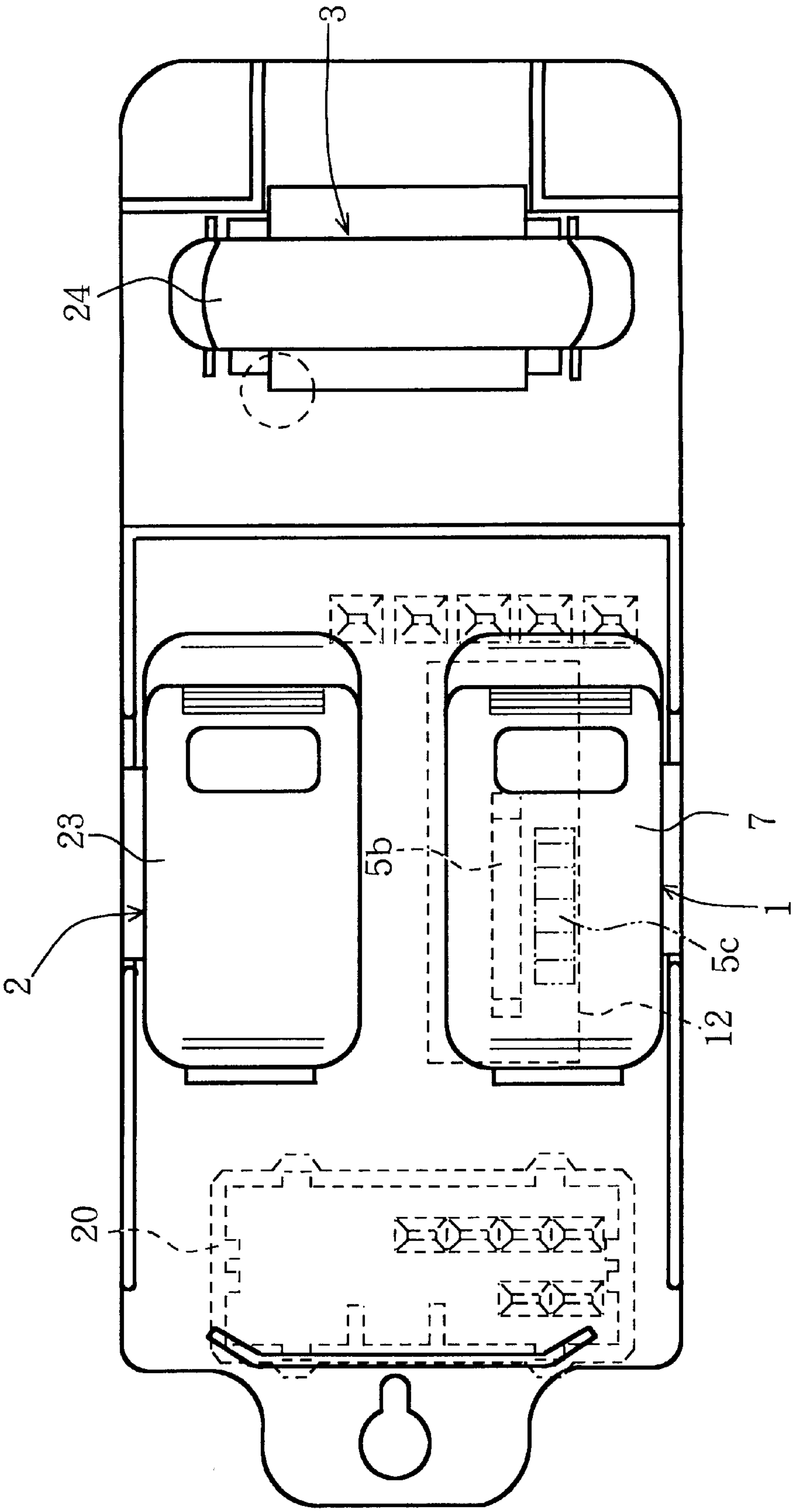
FIG. 2 is a plan view showing whole master switch thereof.
Figure 3:
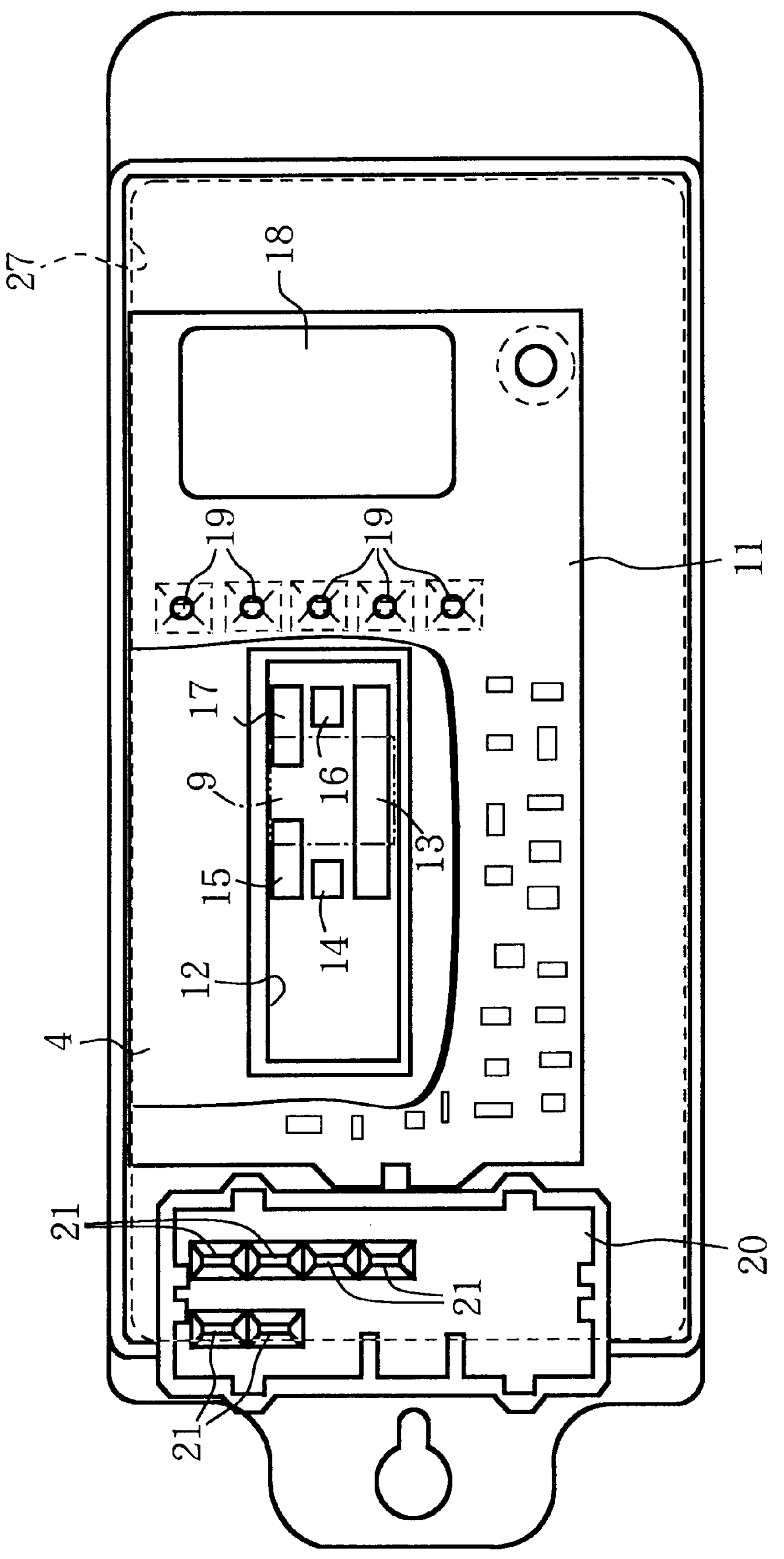
FIG. 3 is a view showing a bottom side eliminating a rear cover and cutting off a part thereof.
Figure 4:
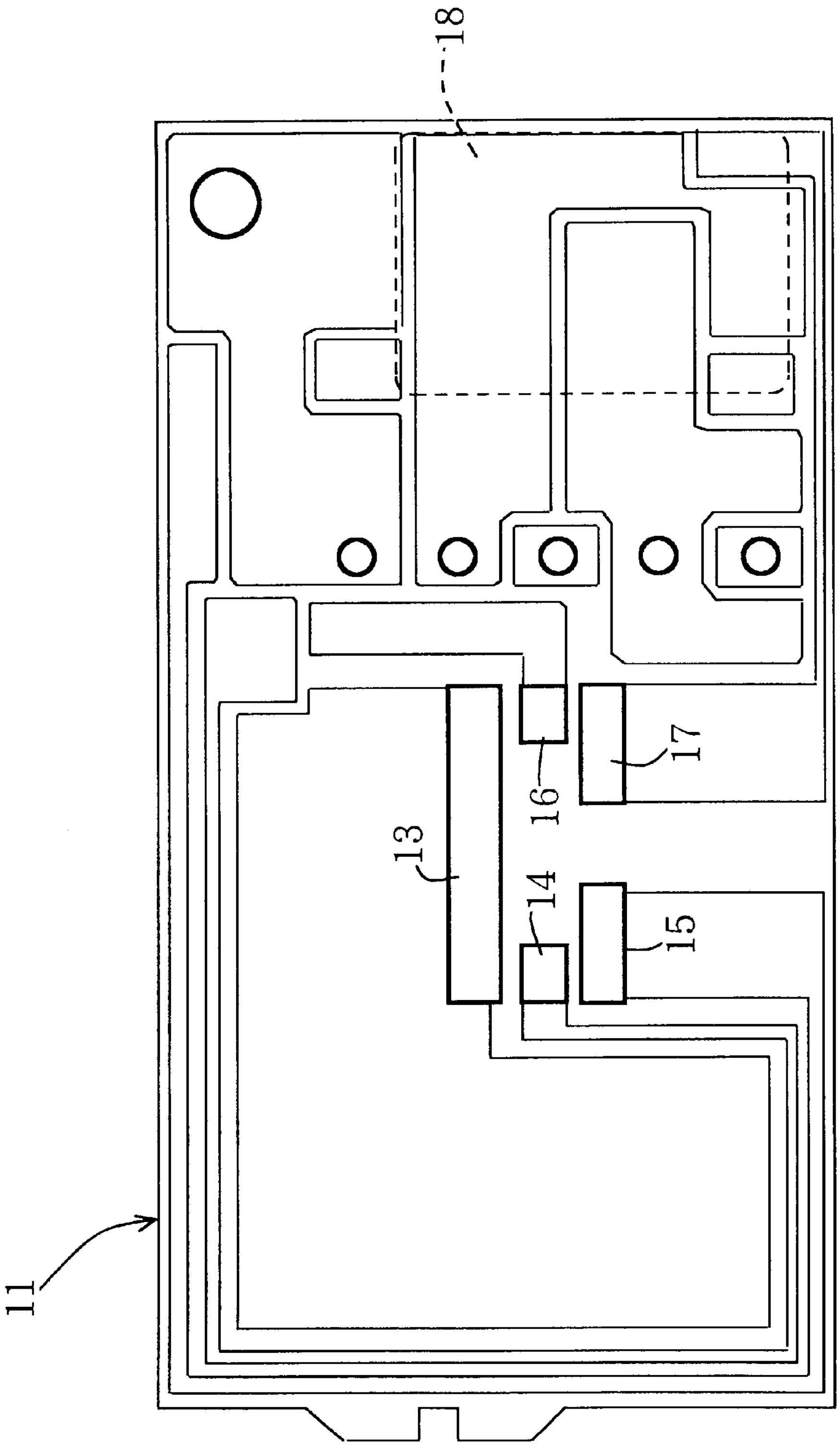
FIG. 4 is a sectional view of an auto circuit board.
Figure 5:
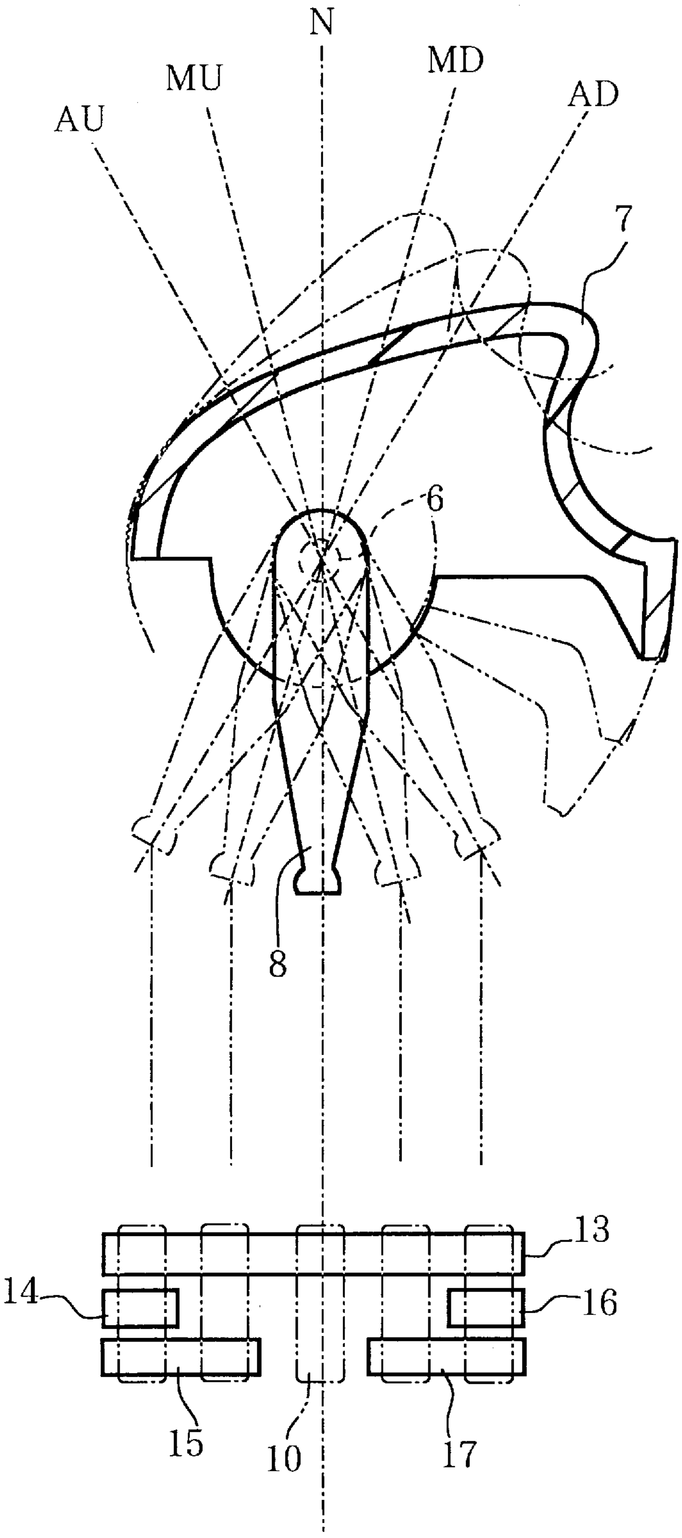
FIG. 5 is a view to explain an operation of a switch.

According to FIG. 1 to FIG. 5, an embodiment of the present invention is explained. FIG. 1 is a sectional view showing a driver switch portion in a master switch for a two door car provided on a driver side door, FIG. 2 is a general plan view, FIG. 3 is a view showing a bottom side thereof removing a rear cover and cutting away a part thereof, FIG. 4 is a plan view of an auto circuit board and FIG. 5 is a drawing for explaining a switch operation.

First, in FIG. 2, this master switch comprises a driver switch 1 constructed as an auto switch and an assistant switch 2 constructed as a manual switch and is arranged to be able to switch on or off an operation of these switches by a main switch 3.

As is apparent from FIGS. 1 and 2, the driver switch comprises a knob 7 supported freely swingable to either direction of up and down with a shaft 6 on a switch base 5 formed projecting upward on the resin-made control equipment main body 4, an arm 8 swinging together with the knob 7, a slider 9 engaging on a tip end of the arm 8 and sliding to a right and left direction following the swing of the arm 8 and an auto circuit board 11 provided with an after stated stationary contact whereon sliding a movable contact 10 of the slider 9 (FIG. 5).

As is shown in FIG. 5, with a well known click mechanism not shown, the knob 7 swings two steps around the shaft 6 from a neutral position N for example to a clockwise direction at a manual down position MD and at an auto down position AD, and inversely to a counterclockwise direction, it swings two steps at a manual up position MU and at an auto up position AU.

The switch base 5 is adapted to be a nearly square pillar, a partition wall 5*a* is formed at a middle portion in a hollow portion thereof, a tip portion of the arm 8 enters into a recess 12 formed on the control equipment main body at a lower portion than the partition wall 5*a* passing through a long hole 5*b* (see FIG. 2) made in the partition wall 5*a* and engages with the slider 9 which is arranged to swing freely in the recess 12.

The recess 12 is made to have a dimension within a swinging limit of the slider 9. Well known click ditch 5*c* (see FIG. 2) is formed in parallel to the long hole 5*b* so that the swinging of the knob 7 is possible to engage with the neutral position, the manual position and the auto position.

As shown in FIG. 3, on a surface position of the auto circuit board 11 overlapping with the recess 12, stationary contacts of the driver switch 1 are provided. Which, as shown in FIG. 4, comprises a ground terminal 13, an auto down terminal 14, a manual down terminal 15, an auto up terminal 16 and a manual up terminal 17 respectively adapted to be a part of a circuit formed on the auto circuit board 11. This circuit is connected to a relay 18 and then the output thereof is sent from the auto circuit board 11 to the control equipment main body through a connecting portion 19.

FIG. 5 is a drawing to explain the knob 7 and a contact action. Since the movable contact 10 contacts only with the ground terminal 13 at a neutral position N, the relay does not operate.

Because, when the knob 7 is operated to the manual down position MD, the movable contact 10 conducts the ground terminal 13 and the manual terminal 15, the relay 18 is made to act only while the knob is pushed to rotate the motor to a direction of window descending.

Further, when the knob is operated to the auto down position, the circuit becomes an auto condition through the movable contact 10 conducts the ground terminal 13, the manual down terminal 15 and the auto down terminal 14, thereafter, even if the knob is detached, the motor continues to rotate until the window finishes to descend.

Similarly, when the knob is operated from the neutral position N to the manual up position MU, the movable contact 10 conducts the ground terminal 13 and the manual up terminal 17 to rotate the motor to a direction of window ascending only while the knob is pushed. Furthermore, when the knob is operated to the auto up position AU, the ground terminal 10 contacts with the auto up terminal 16 also, the motor rotation is automatically kept until the window finishes to ascend.

As shown in FIG. 1, a coupler 20 is formed integrally on the control equipment main body 4 and into which a plurality of coupler terminals 21 project. The coupler terminals 21 are composed by each end portion, which is exposed inside the coupler 20 of a plurality of terminal plates 22 insert molded into the control equipment main body.

A part of the terminal plate 22 is arranged to be a circuit transmitting the output from the relay 18 to the motor of the driver side window and another part is adapted to be a circuit transmitting the output from the main switch 3 to the motor of the assistant side window and to be the power supply circuit.

By the way, the assistant switch 2 is adapted to control the motor of the assistant side window to rotate forward, reverse or to stop rotation by directly switching the switch formed on the control equipment main body through swinging the knob 23 (FIG. 2) to an up or a down side. For such a switch construction, well known various construction can be adapted.

A numeral 25 in FIG. 1 shows a surface side cover which covers the surface side of the control equipment main body 4 exposing the knob 7, the knob 23 and a knob 24 of the switch 3. A numeral 26 shows a rear side cover which covers the auto circuit board 11 and relay 18.

Next, a function of the present embodiment. Hereupon, common numerals are used to show the common portion to the former embodiment. As shown In FIG. 3, since the contact portion of the driver switch 1 is constructed on the auto circuit board 11 and the motor control by the operation of the driver switch 1 is executed through the relay 18, the auto switch can be constructed integrally with the manual switch circuit of the driver switch 1 to be easily composed.

On the other hand, since in the assistant switch 2 side, it is required only to provide the manual circuit portion in the control equipment main body 4 and it is not needed to provide the manual circuit portion of the driver switch 1, it can be made to be compact.

Moreover, because the slider 9 is moved to switch a connection with the stationary contact on the auto circuit board 11 by means of moving the slider 9 by an operation of the knob 7 at a reverse side of the auto circuit board 11 through the recess 12 which is a through hole bored in the control equipment main body 4, a manual circuit forming portion 27 of the control equipment main body 4 is made as nearly the same size as the auto circuit board 11 and they are mutually superposed in an up and down direction, hence the whole equipment can be made extremely compact.

Still more, the equipment is not limited to one for two door vehicle, but can be made to be one provided with more switches such as for a four door vehicle. Also in this case, it is expected to attain a similar effect.

Figure 6:
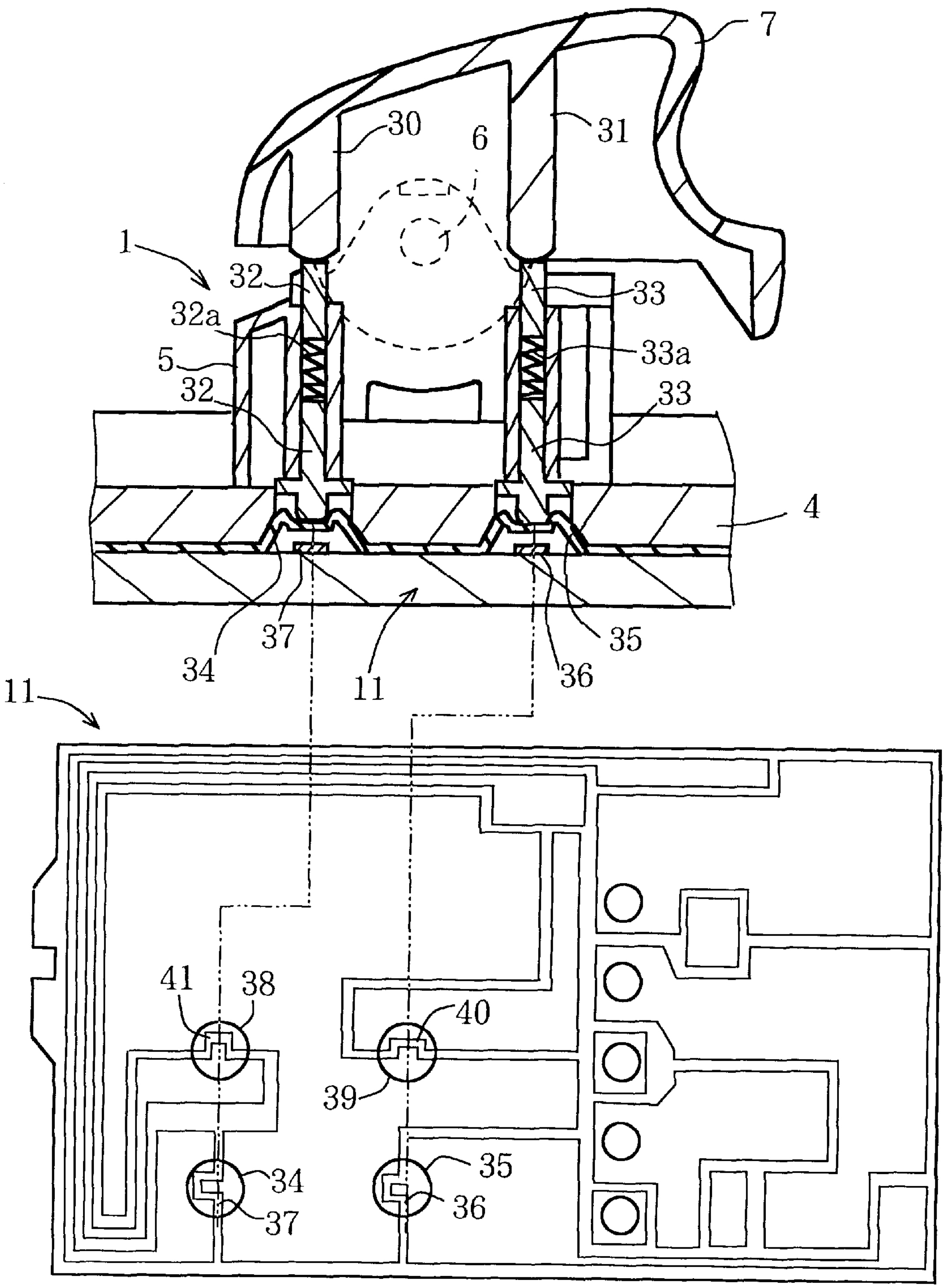
FIG. 6 is a view showing a contact portion of the driver switch according to another embodiment.

FIG. 6 is a view showing a contact portion of the driver switch 1 according to another embodiment. In this example, the driver switch 1 is made as leg portions 30 and 31 thereof formed at symmetrical positions across the shaft 6 to push down selectively each plunger 32 and 33 supported freely movable in the up and down direction on the control equipment main body 4 side and lower ends thereof push down conductive rubber contacts 34 and 35 to contact with a down contact 36 or an up contact 37 of the manual circuit formed on the auto circuit board 11.

In this drawing, the leg portions 30, 31 and the plungers 32, 33 are not shown owing to overlapping respectively to an up and down direction perpendicular to a paper surface, but provided respectively in a pair and conductive rubber contacts 38 and 39 activated by the lower end of the plunger are also arranged to contact with a down contact 40 or an up contact 41 of the auto circuit.

However, since it is required that a swing amount of the knob is made as the conductive rubber contact 38 and 39 in the auto side are not contacted with the down contact 40 and the up contact 41 when the knob 7 is in the manual side, in the shown embodiment, the plungers 32, 33 of the manual side are combined with coil springs 32*a* and 33*a* and a tip projection amount of each plunger 32, 33 in the neutral condition is made larger than that of auto side corresponding therewith.

In the result of this, at first at the manual position, merely the conductive rubber contacts 34 and 35 conduct and at the auto position further pushed down, the coil springs 32*a*, 33*a* of each plunger 32, 33 contract to make the conductive rubber contacts 38, 39 of the auto side also to conduct. Furthermore, various constructions may be adopted as the construction staggering a conducting timing in the manual side and the auto side by a swing stroke, for example, it is possible by such means of making each thickness of the conductive rubber contact 34, 35 to be more thick than that of the conductive rubber contact 38, 39.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. Motor controlling equipment for a power window comprising:

a controlling equipment main body;

an automatic switch operatively connected to a motor for selectively activating a first door window by either a manual operation or an automatic operation;

a manual switch operatively connected to a motor for selectively activating one or more additional door windows by a manual operation;

said manual switch directly controls the motor by a switching operation of a manual circuit formed in said controlling equipment main body;

said automatic switch being mounted relative to an automatic circuit board formed distinct from said controlling equipment main body, said automatic circuit board including switch contacts and relays for the manual operation and the automatic operation, said automatic circuit board being mounted in an overlapping arrangement relative to said controlling equipment main body for controlling the motor through the relays.

2. The motor controlling equipment according to claim 1, wherein the automatic switch is adapted to be controlled by a knob in an opposite side of the automatic circuit board and displaced across the controlling equipment main body through a through hole formed in the controlling equipment main body.

3. The motor controlling equipment according to claim 1, wherein said switch contact of said automatic switch includes a ground terminal, an automatic down terminal, a manual down terminal, an automatic up terminal and a manual up terminal.

4. The motor controlling equipment according to claim 1, and further including a coupler formed on the control equipment main body and being adapted to receive coupler terminals operatively connected to said relays.

5. The motor controlling equipment according to claim 1, and further including a main switch for selectively actuate and deactuate the manual switch and the automatic switch.

6. The motor controlling equipment according to claim 2, wherein the knob includes an arm mounted to said knob, said arm being imparted with movement by said knob for imparting movement to a slider for operating said automatic switch.

7. The motor controlling equipment according to claim 2, wherein the knob is operatively mounted relative to plungers for operating said automatic switch.

* * * * *